US009081357B2

(12) United States Patent
Park et al.

(10) Patent No.: US 9,081,357 B2
(45) Date of Patent: Jul. 14, 2015

(54) IMAGE FORMING APPARATUS HAVING HANDLE UNIT

(71) Applicant: Samsung Electronics Co., Ltd., Suwon-si, Gyeonggi-do (KR)

(72) Inventors: Jin-ho Park, Yongin-si (KR); Young-jae Mok, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 171 days.

(21) Appl. No.: 13/729,542

(22) Filed: Dec. 28, 2012

(65) Prior Publication Data

US 2013/0195504 A1 Aug. 1, 2013

(30) Foreign Application Priority Data

Jan. 27, 2012 (KR) ........................ 10-2012-0008614

(51) Int. Cl.

| | |
|---|---|
| ***E05B 3/00*** | (2006.01) |
| ***A45C 3/00*** | (2006.01) |
| ***A45C 7/00*** | (2006.01) |
| ***A45C 13/22*** | (2006.01) |
| ***A45C 13/26*** | (2006.01) |
| ***A45F 5/10*** | (2006.01) |
| ***A47J 45/00*** | (2006.01) |
| ***B25G 1/10*** | (2006.01) |
| ***A47B 95/02*** | (2006.01) |
| ***G03G 15/00*** | (2006.01) |
| ***G03G 21/16*** | (2006.01) |
| *G03G 21/18* | (2006.01) |

(52) U.S. Cl.

CPC ........ *G03G 21/1661* (2013.01); *G03G 21/1604* (2013.01); *G03G 21/1633* (2013.01); *G03G 21/1846* (2013.01); *G03G 2221/1846* (2013.01)

(58) Field of Classification Search

CPC .................... G03G 21/1846; G03G 2221/1846

USPC ........... 399/107, 108; 292/336.3; 16/438, 443

See application file for complete search history.

(56) References Cited

U.S. PATENT DOCUMENTS

| | | | | |
|---|---|---|---|---|
| 4,705,384 | A * | 11/1987 | Mizutani et al. | 399/108 |
| 6,834,172 | B2 * | 12/2004 | Tomita | 399/108 |
| 2002/0067939 | A1 * | 6/2002 | Hamada et al. | 399/367 |
| 2008/0003066 | A1 * | 1/2008 | Haugaard | 407/29.1 |
| 2012/0043342 | A1 * | 2/2012 | Fjelland | 220/755 |

FOREIGN PATENT DOCUMENTS

JP 2006106280 A * 4/2006

* cited by examiner

*Primary Examiner* — David Gray
*Assistant Examiner* — Tyler Hardman
(74) *Attorney, Agent, or Firm* — Staas & Halsey LLP

(57) ABSTRACT

An image forming apparatus includes a main body and at least one handle unit disposed on the main body. The handle unit includes a fixing bracket disposed on the main body and having a stop portion, a hinge shaft disposed on the fixing bracket, a handle member disposed to rotate with respect to the fixing bracket by the hinge shaft, a hook formed at an end of the handle member, and a hook catching portion formed on the main body, the hook catching portion to which the hook is caught. The hook is caught to the hook catching portion by weight of the handle member.

18 Claims, 11 Drawing Sheets

IMAGE FORMING APPARATUS HAVING HANDLE UNIT

CROSS-REFERENCE TO RELATED APPLICATIONS

This application claims priority under 35 U.S.C. §119(a) from Korean Patent Application No. 2012-0008614 filed Jan. 27, 2012 in the Korean Intellectual Property Office, the disclosure of which is incorporated herein by reference in its entirety.

BACKGROUND OF THE INVENTION

1. Field of the Invention

The present general inventive concept relates to an image forming apparatus. More particularly, the present general inventive concept relates to an image forming apparatus having one or more handle members usable to move the image forming apparatus.

2. Description of the Related Art

Generally, medium and large image forming apparatuses such as medium and large printers or copy machines are provided with portions which users can grip by hand for moving the image forming apparatuses, that is, knobs or handles when the image forming apparatus needs to be moved for installing the image forming apparatus, changing the installation site of the image forming apparatus, etc.

For example, the medium and large image forming apparatuses are generally delivered to the users in a packaged state. Then, the user needs to unpack and install the image forming apparatus on a stand or a double cassette feeder. For this, portions which the user can grip by hand for lifting the image forming apparatus are provided on side surfaces of the image forming apparatus.

The handles have strength so that the user can safely lift the image forming apparatus having a weight between approximate 60 kg and 100 kg without dropping and transforming the lifted image forming apparatus.

FIGS. 1 and 2 illustrate an image forming apparatus 100 having conventional handles 101 and a structure of the handle 101, respectively. Referring to FIGS. 1 and 2, the conventional handle 101 is formed in a recessed handle having a space that is formed on a side surface of the image forming apparatus 100 to receive a hand of a user. Since the recessed handle 101 occupies a space which the hand can enter or insert inside the image forming apparatus 100 and parts or components, such as a fusing apparatus, a printed circuit board, etc., that may cause injury on the hand of the user should not be disposed in a space 103 near the handle 101, the image forming apparatus 100 provided with the recessed handle 101 becomes large in size. If the size of the recessed handle 101 is reduced for decreasing the size of the image forming apparatus 100, the space into which the user inserts the user's hand is reduced such that the user cannot stably hold and carry the image forming apparatus 100. Therefore, the recessed handle 101 makes miniaturization of the image forming apparatus 100 difficult. In FIG. 1, a reference numeral 112 represents a stand on which the image forming apparatus 100 is installed.

For solving this problem, protrusion handles formed to project to the outside of the image forming apparatus 100 are provided. However, when the image forming apparatus 100 is carried and installed, the protrusion handles may interfere with objects around the image forming apparatus 100. If the protrusion handles interferes with the objects outside the image forming apparatus 100, the protrusion handles are damaged and difficult to be used. Further, the protrusion handles are generally disposed on a portion of a side surface of the image forming apparatus 100 near the bottom surface of the image forming apparatus 100 for ease of moving. If the protrusion handles disposed near the bottom surface of the image forming apparatus 100 are damaged by the interference, a main body frame of the image forming apparatus 100 may be transformed by impact of the conflict. At this time, since a printing media feeding unit is provided on the bottom of the main body of the image forming apparatus 100, if the main body frame is transformed by the interference of the protrusion handles, the printing media feeding unit may not supply properly printing media.

Therefore, there is a need to develop an image forming apparatus having handles that can stably lift the heavy image forming apparatus and be automatically received inside a main body when the handles are not used.

SUMMARY OF THE INVENTION

The present general inventive concept provides an image forming apparatus having at least one handle that can occupy a smaller space to reduce a size of the image forming apparatus, and, when not being used, can be automatically received inside a main body of the image forming apparatus so as to prevent the handle from interfering with other objects outside the image forming apparatus.

The present general inventive concept provides an image forming apparatus having at least one handle that can have a simpler structure to reduce manufacturing costs and to be fixed to a main body of the image forming apparatus to avoid vibration or free movement even when the vibration or the free movement is transmitted to the image forming apparatus.

Additional features and utilities of the present general inventive concept will be set forth in part in the description which follows and, in part, will be obvious from the description, or may be learned by practice of the general inventive concept The above and/or other features and utilities of the present general inventive concept can substantially be achieved by providing an image forming apparatus which may include a main body of the image forming apparatus, and at least one handle unit disposed on the main body, wherein the handle unit may include a fixing bracket disposed on the main body and having a stop portion, a hinge shaft disposed on the fixing bracket, a handle member disposed to rotate with respect to the fixing bracket by the hinge shaft, a hook formed at an end of the handle member, and a hook catching portion formed on the main body to catch or snap the hook by weight of the handle member.

The main body may be provided with a handle receiving portion to receive the handle member, and when the handle member is received in the handle receiving portion, a top surface of the handle member may be positioned at the substantially same plane as a surface of the main body.

The handle member may include a handle cover, and when the handle member having the handle cover is received in the handle receiving portion, a top surface of the handle cover is positioned at the substantially same plane as the surface of the main body.

The handle member may be formed of a metal, and the handle cover may be formed of a plastic injection molding.

The image forming apparatus may include an external cover disposed on the main body, and the external cover may include an opening having a shape corresponding to the handle member therein.

The hook catching portion may be formed on the external cover.

The fixing bracket may include elongate holes in which the hinge shaft is inserted and can be moved up and down in a direction of gravity.

The external cover may include a hook releasing groove formed on a portion corresponding to an end of the handle member in a lengthwise direction of the handle member when the handle member is positioned in the opening of the external cover.

The external cover may be formed of a plastic injection molding.

The handle member may include an inclined surface formed in front of the hook on a bottom end of the handle member.

The fixing bracket may be formed as a single piece part with the main body.

The fixing bracket may include at least two fixing brackets disposed on a side surface of the main body and near a bottom surface of the main body.

The image forming apparatus may include at least two recessed handles formed on a side surface of the main body opposite to the side surface on which the fixing bracket is disposed.

The above and/or other features and utilities of the present general inventive concept may also be achieved by providing a handle unit usable with an apparatus having a main body, the handle unit including a fixing bracket disposed on the main body and having a stop portion, a hinge shaft disposed on the fixing bracket, a handle member disposed to rotate with respect to the fixing bracket by the hinge shaft, a hook formed at an end of the handle member, and a hook catching portion formed on the main body, the hook catching portion to which the hook is caught, wherein the hook is caught to the hook catching portion by weight of the handle member.

The above and/or other features and utilities of the present general inventive concept may also be achieved by providing a handle unit usable with an image forming apparatus having a main body, the handle unit including a handle member having a handle hinge portion, a middle portion, and a hook disposed along a first direction, and having a thickness in a second direction having an angle with the first direction, and a fixing bracket formed on the main body along the first direction, and having side portions extended in the second direction to provide a space to receive the handle member, a fixing hole portion connectable to the handle hinge portion of the handle member such that the handle member rotates with respect to the handle hinge portion between a first position and a second position, a stop portion to contact the handle member disposed in the second position, and a hook catching portion to be coupled to the hook of the handle member moving from the second position to the first position by weight of the handle member.

The handle member may have a middle portion extended along the first direction and side portions extended from both sides of the middle portion to have the thickness in the second direction to provide strength to the handle member when the handle member is in the second position and contacts the stop portion of the fixing bracket.

The side portions may have the thickness in the second direction and a length in the first direction, and the length may be longer than the thickness.

The handle member may have a length between the handle hinge portion and the hook the in the first direction to provide a coupling force between the hook and the hook catching portion when the handle member rotates from the second position to the first position, and the length is longer than the thickness.

The fixing bracket may include an inclined surface to guide the hook to the hook catching portion during a coupling operation between the hook and the hook catching portion according to the weight of the handle member.

The handle hinge portion may include a hinge disposed in a hole of the fixing hole portion of the fixing bracket when the handle member is coupled to the fixing bracket, and the hole may have an area larger that the hinge to provide a space for the hinge to move such that the hook is released from the hook catching portion to move from the first portion to the second portion.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF EMBODIMENTS

Figure 1:
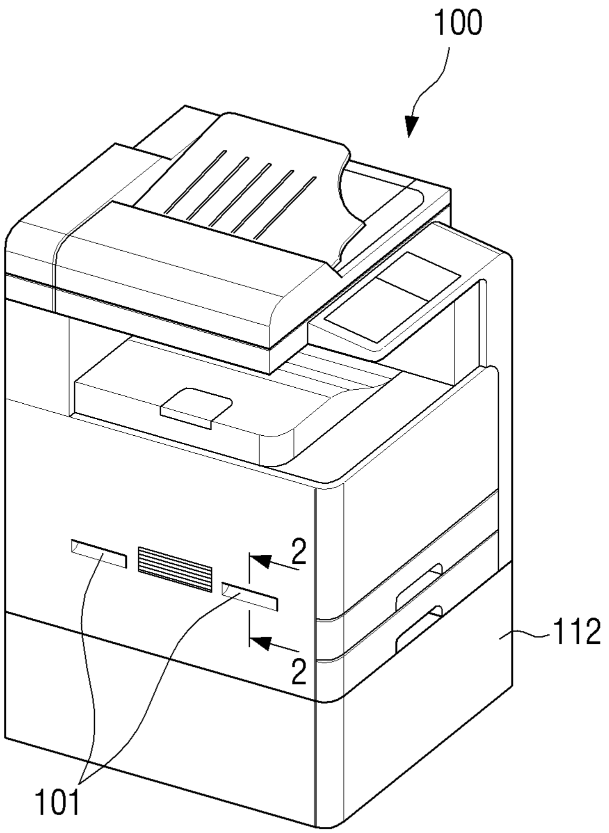
FIG. 1 is a perspective view illustrating an image forming apparatus having conventional handles.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

Figure 3:
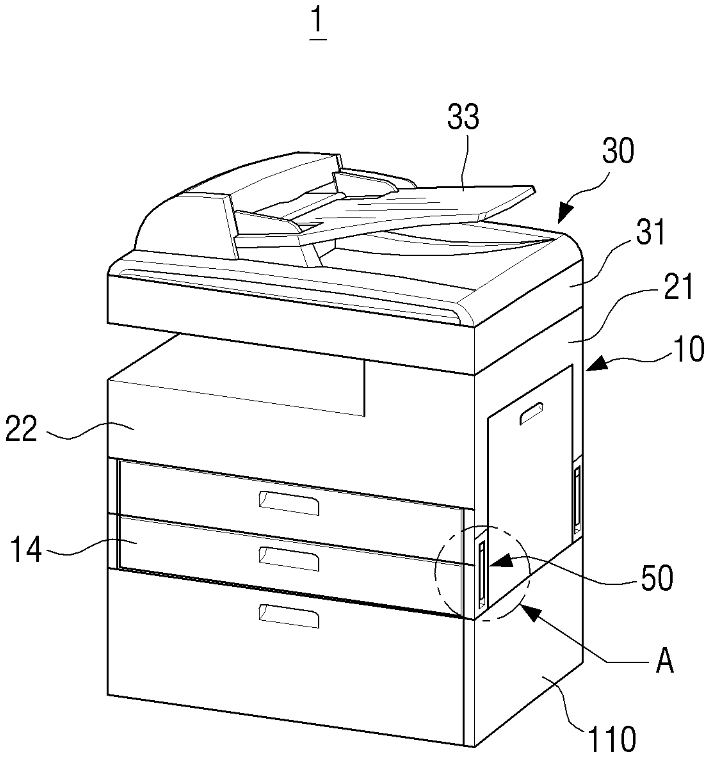
FIG. 3 is a perspective view schematically illustrating an image forming apparatus having one or more handle units according to an exemplary embodiment of the present general inventive concept.
Figure 4:
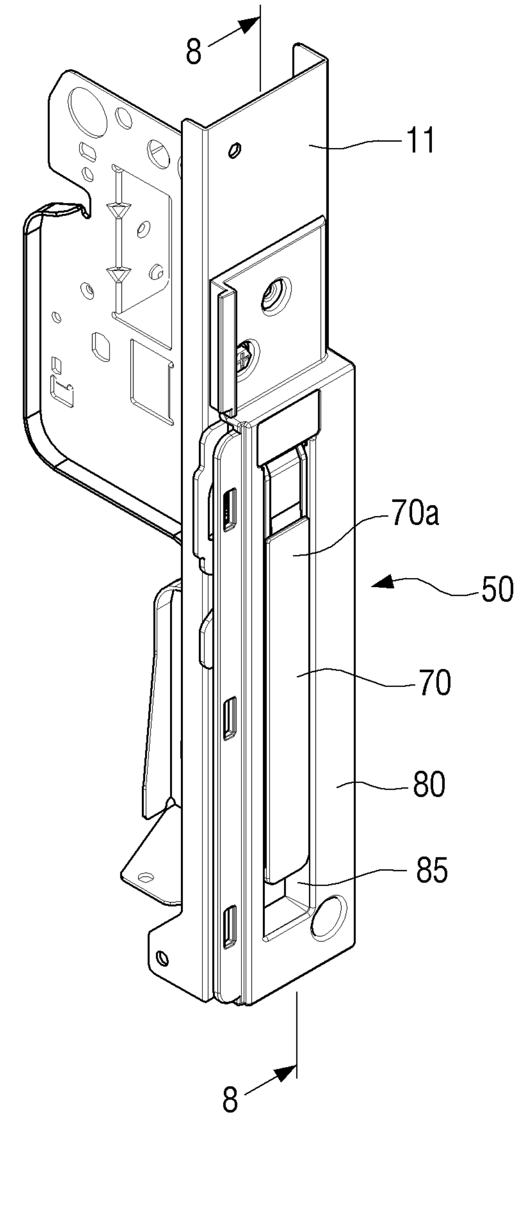
FIG. 4 is a partially enlarged perspective view illustrating the handle unit of FIG. 3.
Figure 5:
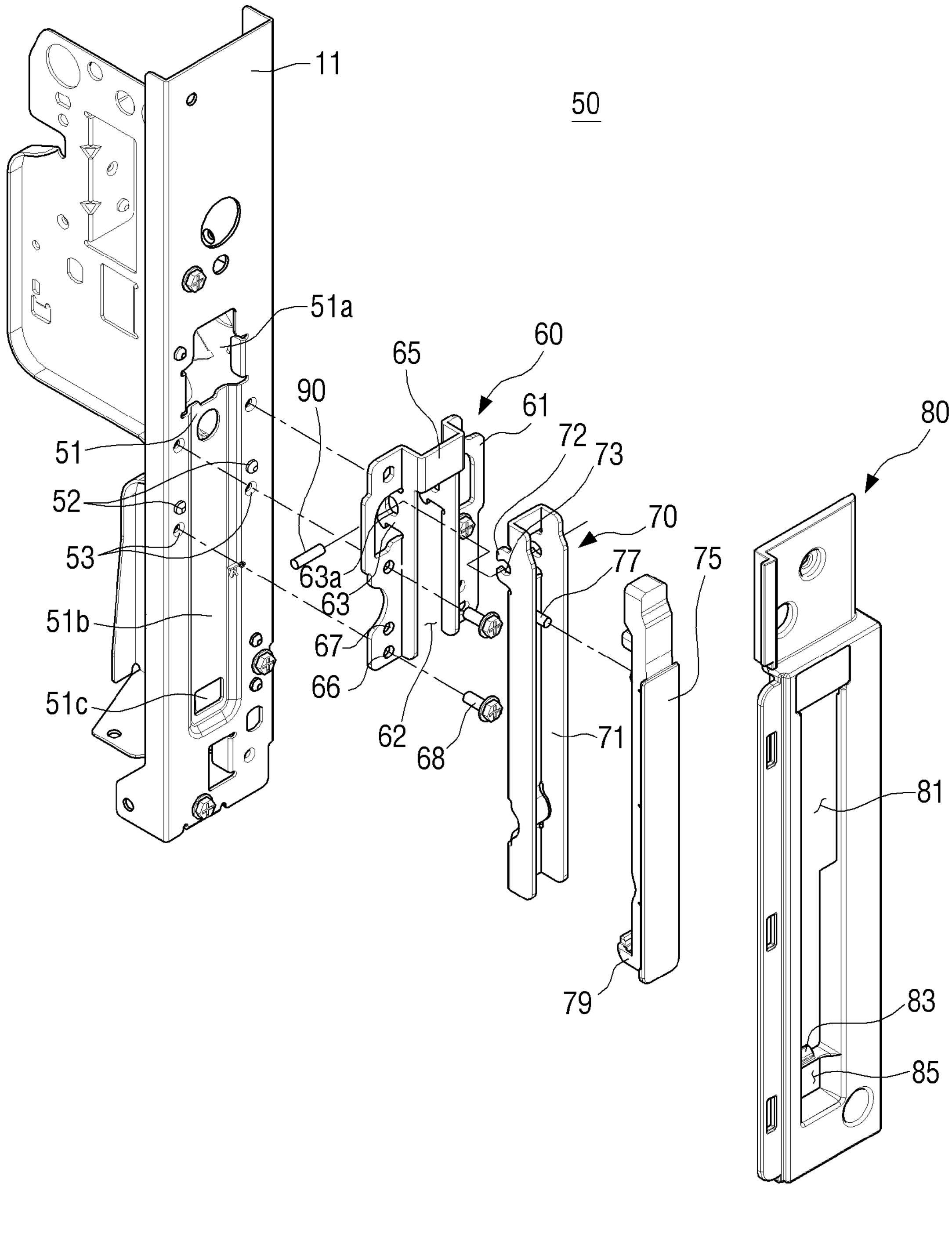
FIG. 5 is an exploded perspective view illustrating the handle unit of FIG. 4.
Figure 6:
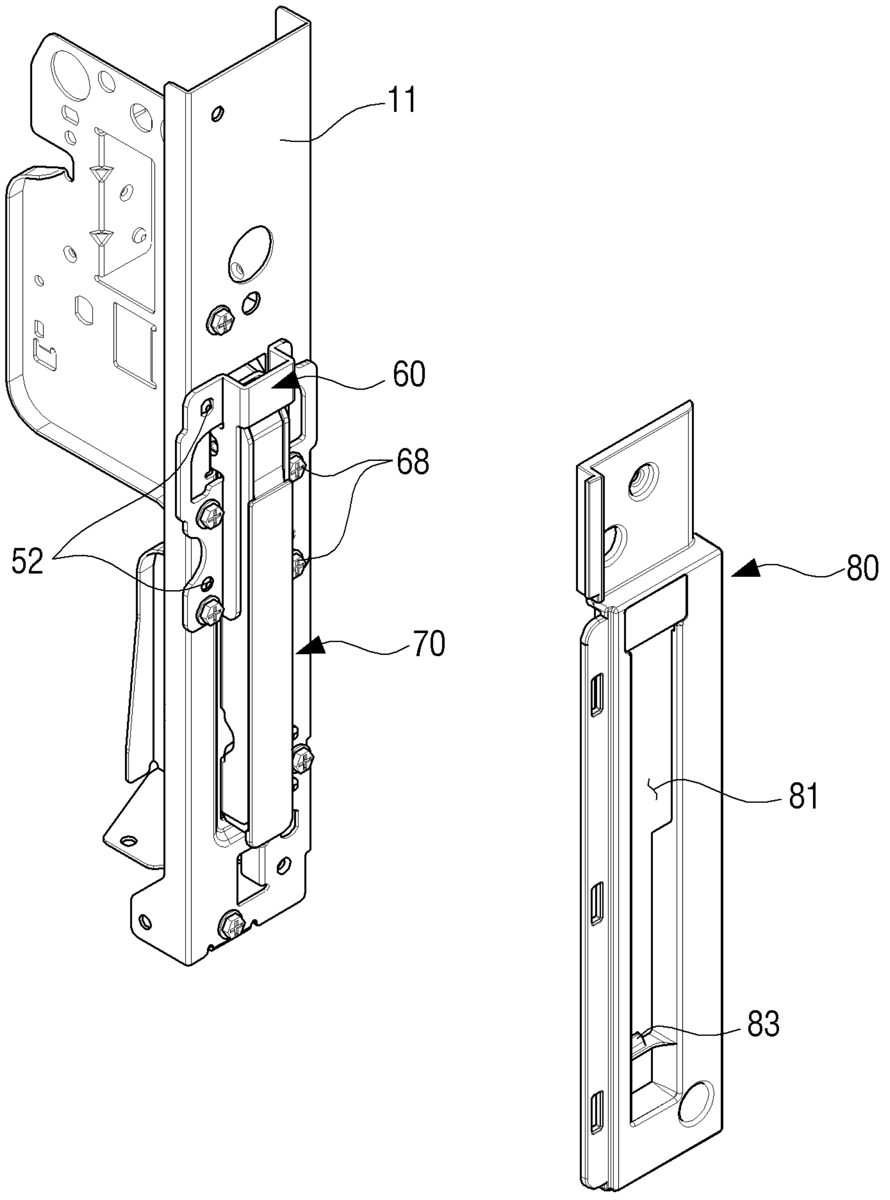
FIG. 6 is a partially enlarged perspective view illustrating the handle unit of FIG. 4 from which an external cover is separated.
Figure 7:
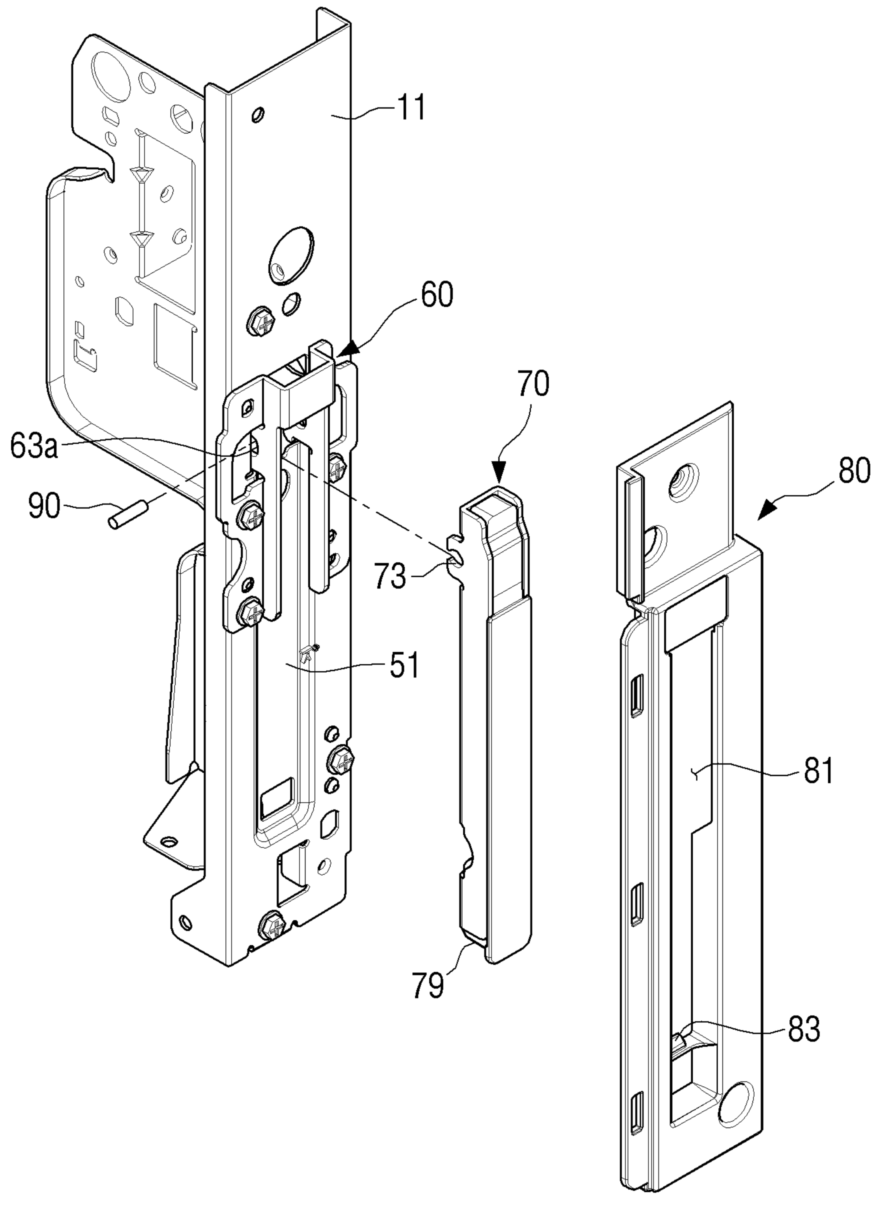
FIG. 7 is a partially enlarged perspective view illustrating the handle unit of FIG. 6 from which a handle member is separated.
Figure 8:
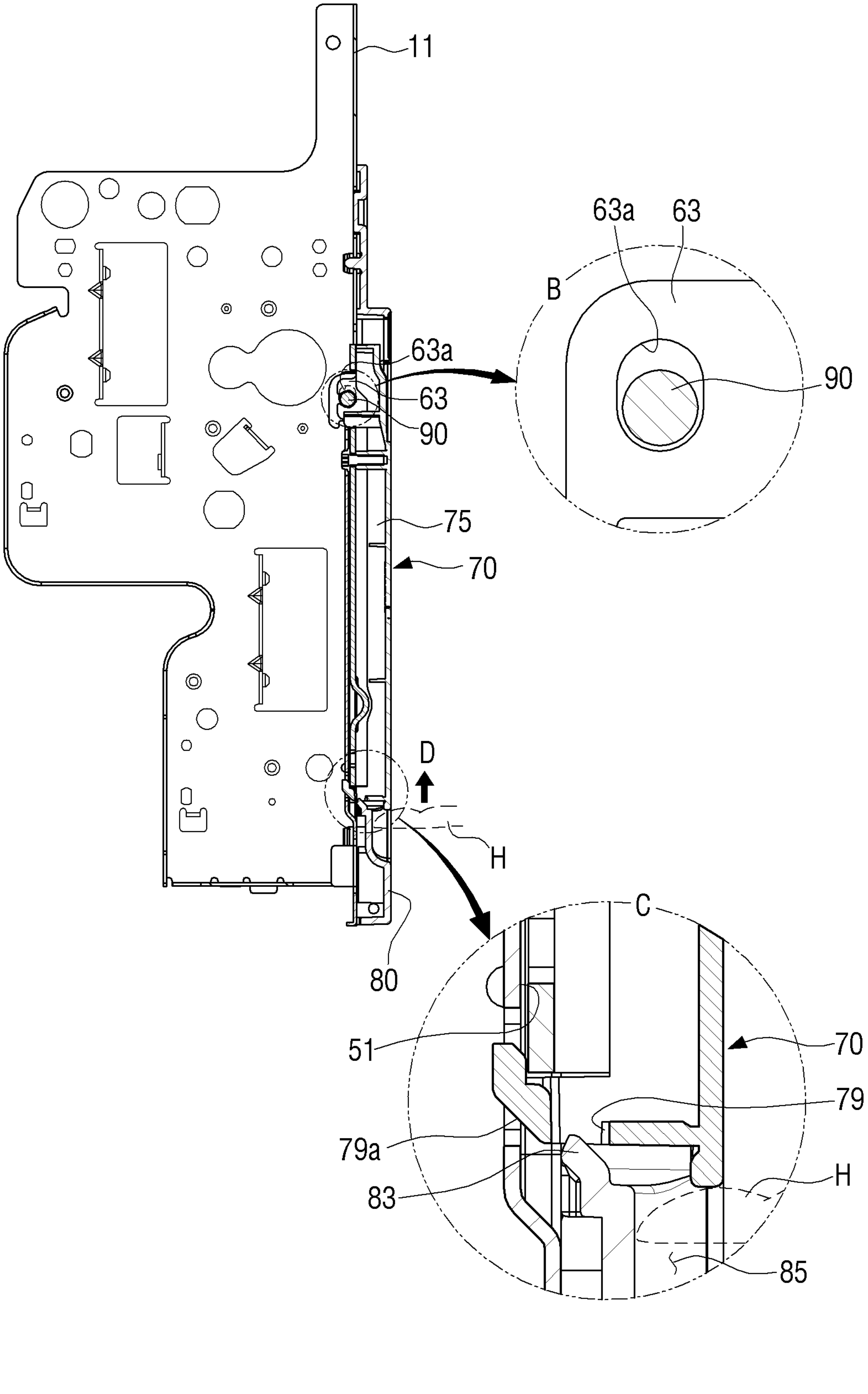
FIG. 8 is a partially sectional view taken along a line 8-8 in the handle of FIG. 4.

FIG. 3 is a perspective view schematically illustrating an image forming apparatus having one or more handle units according to an exemplary embodiment of the present general inventive concept. FIG. 4 is a partially enlarged perspective view illustrating the handle unit of FIG. 3, and FIG. 5 is an exploded perspective view illustrating the handle unit of FIG. 4. FIG. 6 is a partially enlarged perspective view illustrating the handle unit of FIG. 4 from which an external cover is separated, and FIG. 7 is a partially enlarged perspective view illustrating the handle unit of FIG. 6 from which a handle member is separated. Also, FIG. 8 is a partially sectional view taken along a line 8-8 in the handle unit of FIG. 4.

Referring to FIG. 3, an image forming apparatus 1 according to an exemplary embodiment of the present general inventive concept is disposed on a stand 110 or a reference surface and includes a main body 10, an image forming unit disposed inside the main body 10, and a scanning unit 30 disposed on a top side of the main body 10. Although FIG. 3 illustrates the image forming apparatus 1 as an embodiment of the present general inventive concept, the present general inventive concept is not limited thereto. It is possible that an apparatus having one or more functional unit with mechanical and/or electrical components can be used as an embodiment of the present general inventive concept.

The main body 10 may include a main body frame 11 and one or more covers 21 and 22 that are disposed on the main body frame 11 to form an external appearance of the image forming apparatus 1. The image forming unit is disposed inside the main body 10 to perform an image forming operation to print an image on a printing medium. At least one handle unit 50 is provided on a side surface of the main body 10, that is, the main body frame 11. Referring to FIG. 3, in the present exemplary embodiment, two handle units 50 are formed on a right side surface of the main body 10. Although a left side surface of the main body 10 is not illustrated in FIG. 3, the left side surface thereof may be provided with the same two handle units as the two handle units 50 disposed on the right side surface of the image forming apparatus according to an exemplary embodiment of the present genera inventive concept.

Figure 2:
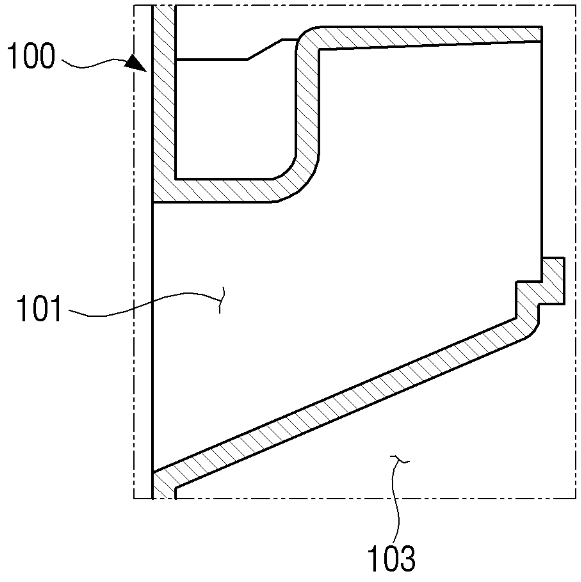
FIG. 2 is a partially sectional view taken along a line 2-2 in the image forming apparatus of FIG. 1.

It is possible that one or two recessed handles 101 of FIGS. 1 and 2 may be formed on a left side surface of the main body 10 of the image forming apparatus 1 when the image forming apparatus 1 has a spare space to be formed with the recessed handles 101 inside the left side surface of the image forming apparatus 1 without increasing a size of the main body 10 of the image forming apparatus 1. When the image forming apparatus 1 does not have such a spare space to form the recessed handles 101, the handle unit 50 according to an exemplary embodiment of the present general inventive concept may be disposed on the left side surface of the image forming apparatus 1.

The image forming unit forms an image on a printing medium, can use various types of image forming units, and is disposed inside the main body 10. In the present exemplary embodiment, an electro photographic image forming unit is used as the image forming unit. Therefore, the image forming unit may include a printing media feeding unit to feed printing media one by one, an exposure unit to emit light corresponding to printing data, an image forming cartridge including an image carrier on which a predetermined electrostatic latent image is formed by the light emitted from the exposure unit, and a developing roller to develop the electrostatic latent image formed on the image carrier into a developer image, a transferring unit to transfer the developer image formed on the image carrier onto the printing medium, and a fusing unit to fuse the developer image onto the printing medium. The printing media feeding unit may include a printing medium feeding cassette 14 provided in a lower portion of the image forming apparatus 1. FIG. 3 illustrates the image forming apparatus 1 having two printing medium feeding cassettes 14. Since image forming unit is well known, a detailed explanation of the structure and functions of the image forming unit will be omitted.

The scanning unit 30 is disposed on the top side of the main body 10 and scans a document to form image data or printing data. The scanning unit 30 includes a flatbed scanning unit 31 to scan a document and an automatic document feeding unit 33 that is disposed on the top side of the flatbed scanning unit 31 and automatically supplies the documents. Since flatbed scanning unit 31 and the automatic document feeding unit 33 are well known, a detailed explanation of structures and functions thereof will be omitted.

The handle unit 50 is gripped and lifted by a user when the user moves the image forming apparatus 1. At least one handle unit 50 may be disposed on a side surface of the main body 10. Referring to FIG. 3, in an exemplary embodiment of the present general inventive concept, two handle units 50 are disposed on a right side surface of the main body 10 of the image forming apparatus 1. The handle unit 50 is disposed near a bottom surface of the image forming apparatus 1 to easily lift the image forming apparatus 1. Therefore, referring to FIG. 3, the handle unit 50 is disposed on a lower portion of the right side surface of the main body 10 and near the printing media feeding cassette 14. However, the present general inventive concept is not limited thereto. It is possible that the handle unit 50 can be disposed on a middle or top portion of a side surface of the main body 10. When more than two handle units 50 are installed to the image forming apparatus 1, the handle units 50 may be disposed at a same height from the stand 110 or reference surface. However, it is possible that one handle unit 50 can be disposed at a first height from the stand 10 or reference surface and the other handle 50 cane be disposed at a second height from the stand 10 or reference surface according to a user preference, a structural preference, a space availability, a weight distribution of the image forming apparatus, etc.

Referring to FIGS. 4 to 8, the handle unit 50 according to an exemplary embodiment of the present general inventive concept may include a fixing bracket 60, a hinge shaft 90, a handle member 70, and an external cover 80.

The fixing bracket 60 is disposed on the main body frame 11 and supports the handle member 70 to rotate with respect to the fixing bracket 60 or the main body frame 11. The main body frame 11 is provided with a handle receiving portion 51 in which the handle member 70 can be received. In FIGS. 4 to 8, the main body frame 11 does not indicate the entire frame to form the main body 10 of the image forming apparatus 1 but indicate a portion of the main body frame 11 in which the handle unit 50 is disposed. Also, FIGS. 4 to 8 illustrate the main body frame 11 from which the covers 21 and 22 of FIG. 3 are separated for illustration purpose of related portions of the present embodiment.

The handle receiving portion 51 may be formed to have a thickness such that when the handle member 70 is received in the handle receiving portion 51 of the main body frame 11, a top surface 70*a* of the handle member 70 is positioned on substantially the same plane as an external surface of the main body frame 11. If the external cover 80 is disposed on the main body frame 11 as the present exemplary embodiment illustrated in FIG. 4, the handle receiving portion 51 is formed to have a thickness such that the top surface 70*a* of the handle member 70 is positioned on substantially the same plane as an external surface of the external cover 80.

The handle receiving portion 51 of the main body frame 11 may have a hinge portion receiving space 51*a* to receive or accommodate the hinge fixing portion 63 of the fixing bracket 60 and the handle hinge portion 72 of the handle member 70. The handle receiving portion 51 of the main body frame 11 may also have a handle receiving space 51*b* to receive or accommodate at least a middle portion of the handle member 70. The handle receiving portion 51 of the main body frame 11 may also have a hook receiving space 51*c* to receive or accommodate at least a portion of a hook 79 of the handle member 70.

The fixing bracket 60 includes a base portion 61, a fixing hinge portion 63, and a stop portion 65. The base portion 61 allows the fixing bracket 60 to be fixed to the main body frame 11 and is provided with a through portion 62 in which the handle member 70 is received in a middle of the base portion 61. A plurality of fixing holes 66 corresponding to a plurality of screw holes 53 formed on the main body frame 11 are formed on the base portion 61 around the through portion 62. Also, a plurality of reference holes 67 into which a plurality of reference projections 52 formed on the main body frame 11 are inserted are formed on the base portion 61.

Accordingly, after the reference projections 52 formed on the main body frame 11 are inserted into corresponding ones of the plurality of reference holes 67 of the base portion 61 of the fixing bracket 60, the plurality of fixing holes 66 of the base portion 61 of the fixing bracket 60 are aligned with corresponding ones of the plurality of screw holes 53 of the main body frame 11 and the fixing bracket 60 does not freely move with respect to the main body frame 11. In this state, screws 68 are coupled to the main body frame 11 through corresponding ones of the plurality of fixing holes 66 of the fixing bracket 60 and the screw holes 53 of the main body frame 11 such that the fixing bracket 60 is fixed to the main body frame 11. In an exemplary embodiment of the present general inventive concept, the fixing bracket 60 is provided with four fixing holes 66 and three reference holes 67. Accordingly, the main body frame 11 is provided with four screw holes 53 and three reference projections 52 corresponding to those. Further, a portion of the main body frame 11 on which the fixing bracket 60 is disposed is formed to have strength to withstand or correspond the weight of the image forming apparatus 1.

The fixing hinge portion 63 is extended from the base portion 61, has a length in a vertical direction, and provided with a fixing hinge hole 63*a* in which the hinge shaft 90 is inserted. The fixing hinge hole 63*a* is formed as an elongated hole such that the hinge shaft 90 can move a predetermined distance in a vertical direction of gravity, that is, in a direction parallel to the base portion 61. However, alternatively, the fixing hinge hole 63*a* may be formed in a circular hole having a space to provide the movement of the hinge shaft 90 therein.

The stop portion 65 is formed to block rotation of the handle member 70 in an upper portion of the base portion 61. The stop portion 65 is formed to limit the rotation of the handle member 70 when the handle member 70 has an angle, approximately 90 degrees, with respect to the main body frame 11 or with respect to a vertical direction thereof. Accordingly, when the user grips the handle member 70 and lifts the image forming apparatus 1, the weight of the image forming apparatus 1 is applied to the stop portion 65 of the fixing bracket 60. Accordingly, the stop portion 65 of the fixing bracket 60 is formed of a material having strength to withstand or correspond to the weight of the image forming apparatus 1.

In the above-described explanation, the fixing bracket 60 is formed as a separated member from the main body frame 11 to be fixed to the main body frame 11. However, although not illustrated, the fixing bracket 60 may be formed integrally with the main body frame 11. In other words, the fixing bracket 60 is not formed as a separate member, but the fixing hinge portion 63 and the stop portion 65 may be formed on a portion of the main body frame 11 on which the fixing bracket 60 is disposed. That is, it is possible that the fixing bracket 60 and the main body frame 11 can be formed as a single integrated body or a single monolithic body.

The hinge shaft 90 is formed in a cylindrical rod shape and connects the handle member 70 to the fixing bracket 60 so that the handle member 70 can rotate with respect to the fixing bracket 60. Accordingly, when the user uses the handle unit 50, the handle member 70 rotates about the hinge shaft 90.

The handle member 70 is gripped by hands of the user to move the image forming apparatus 1 and disposed to rotate with respect to the fixing bracket 60 by the hinge shaft 90. The handle member 70 may be formed of a material to withstand or correspond to the weight of the image forming apparatus 1 and in a bar shape that can be caught by a user hand. The handle member 70 includes handle hinge portions 72 having handle hinge holes 73 to which the hinge shaft 90 is coupled. The handle hinge holes 73 are formed to have a certain diameter so that the hinge shaft 90 can be inserted in and freely rotate with respect to or can be locked to the handle hinge holes 73. Accordingly, after the handle hinge holes 73 of the handle member 70 and the fixing hinge holes 63*a* of the fixing bracket 60 are positioned to be aligned with each other and the hinge shaft 90 is inserted into the fixing hinge holes 63*a* and the handle hinge holes 73 from one side thereof, the handle member 70 is rotatably coupled to the fixing bracket 60.

The handle member 70 may be formed of a rigid material such as a metal and as a single piece part. However, in the present exemplary embodiment, for reducing weight and uniformity of appearance, the handle member 70 is formed to have a structure in that a handle cover 75 formed of synthetic resins such as plastics is attached to the handle member 70. In other words, as illustrated in FIG. 5, the handle member 70 is bent in a substantially flattened U shape such that elongated side sections are extended from both elongated sides of an elongated middle section to form, for example, a U shape. The plastic handle cover 75 is coupled to a groove 71 of the handle member 70, thereby entirely forming a substantially bar shape. The groove 71 can be defined by an inside of the U shape of the handle member 70. The handle cover 75 may be formed in a shape corresponding to the bent shape of the handle member 70 by injection molding of plastic or synthetic resin. The handle member 70 and the handle cover 75 may be coupled to each other by screws or hooks. FIG. 5 illustrates the handle member 70 and the handle cover 75 coupled by the hooks 77.

In the case of the handle member 70 having the above-described structure, after the handle member 70 to which the handle cover 75 is coupled is received in the handle receiving portion 51 of the main body frame 11, the top surface of the handle cover 75 is positioned on substantially the same plane as the surface of the external cover 80 disposed on the main body frame 11.

Figure 9:
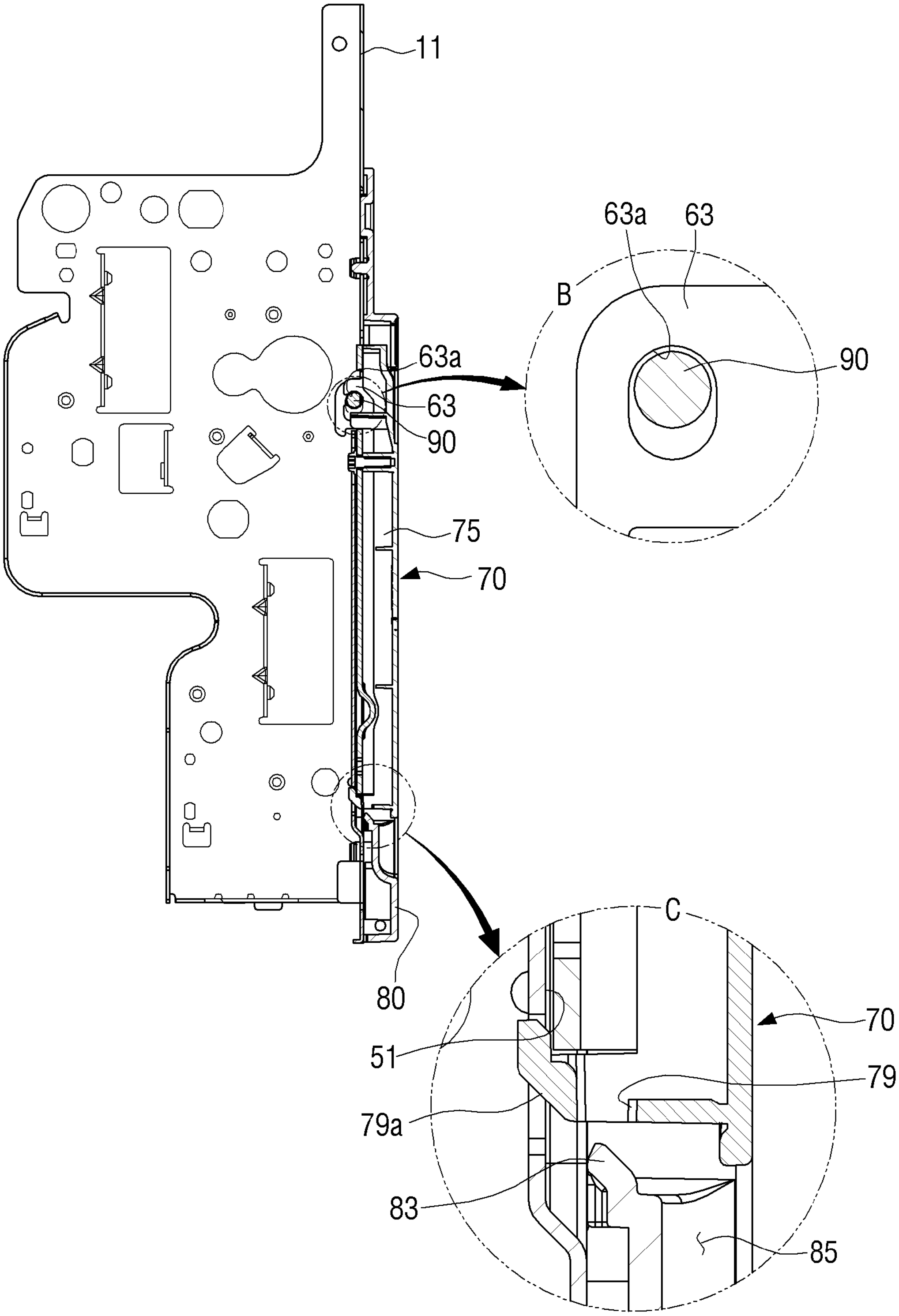
FIG. 9 is a partially sectional view illustrating the handle unit of FIG. 8 when a handle member is lifted up.

The handle member may include a first end formed with the handle hinge portion 72 and a second end formed with a hook 79. The second end may be disposed opposite to the first end of the handle member 70 with respect to the middle portion of the handle member 70. A hook catching portion 83 to which the hook 79 of the handle member 70 is caught may be formed on the main body frame 11. Alternatively, if there is the external cover 80 as the present exemplary embodiment, the hook catching portion 83 may be formed on the external cover 80. The hook 79 of the handle member 70 and the hook catching portion 83 of the main body frame 11 are formed so that after the handle member 70 rotates and or moves about the hinge shaft 90 due to the weight of the handle member 70, the hook 79 is caught to the hook catching portion 83. Referring to FIGS. 8 and 9, in the present exemplary embodiment, the hook 79 is formed as a hole at the lower end of the handle member 70 and the hook catching portion 83 is formed as a protrusion shape to project from the external cover 80 to be coupled to the handle member 70 through the hole formed on the handle member 70.

Further, an inclined surface **79*a* is provided on the lower end of the handle member 70 so that the hook 79 can be smoothly caught to the hook catching portion 83 by force of the handle member 70 that is rotated or moves by the weight of the handle member 70. As a result, when the user releases the handle member 70, the handle member 70 is rotated about the hinge shaft 90 such that the hook 79 of the handle member 70 is hooked to the hook catching portion 83 according to the weight of the handle member 70 without additional force. After the handle member 70 is hooked to the external cover 80, even when vibration is applied to the image forming apparatus 1 from an outside thereof, the handle member 70 is not vibrated with respect to the image forming apparatus 1. Therefore, the handle member 70 does not generate noise. It is also possible that when vibration or force is generated from an inside of the image forming apparatus during an operation of the image forming apparatus, for example, an image forming operation or a maintenance operation, the handle member 70 is prevented from vibrating, moving, or detaching from the main body frame 11**.

The external cover 80 is disposed on the main body frame 11 and formed in a substantially rectangular shape. The external cover 80 is provided with an opening 81 having a shape corresponding to the handle member 70 being received in the handle receiving portion 51. The external cover 80 may be formed by injection molding of plastic or synthetic resin for uniformity with the covers 21 and 22 disposed on the main body frame 11 of the image forming apparatus 1. The hook catching portion 83 to which the hook 79 of the handle member 70 is caught is formed on a bottom end of the opening 81 of the external cover 80. The hook catching portion 83 is formed in a protrusion shape so that when the handle member 70 is rotated downwardly with respect to the hinge shaft 90 by the weight of the handle member 70, the hook 79 of the handle member 70 is caught to the hook catching portion 83.

Further, a hook releasing groove 85 is formed below one end of the handle member 70 in a lengthwise direction of the handle member 70 when the handle member 70 is positioned in the opening 81 of the external cover 80, that is, on a portion of the external cover 80 corresponding to below the hook 79 of the handle member 70. In other words, the hook releasing groove 85 is formed below the hook catching portion 83 of the external cover 80. The hook releasing groove 85 may be formed to have a size in which a fingertip H of the user can be inserted. Accordingly, when the user inserts the fingertip H into the hook releasing groove 85 and pushes up the bottom end of the handle member 70, the handle member 70 is moved upwardly so that the hook 79 of the handle member 70 is released from the hook catching portion 83 of the external cover 80. At this time, a distance which the handle member 70 can be moved up and down corresponds to a length of the elongated hole of the fixing hinge hole **63*a* of the fixing hinge portion 63**.

In the present exemplary embodiment, the hook catching portion 83 and the hook releasing groove 85 are formed on the external cover 80. However, as another exemplary embodiment, the hook catching portion 83 and the hook releasing groove 85 may be directly formed on the main body frame 11.

Hereinafter, operation of the image forming apparatus 1 according to an exemplary embodiment of the present general inventive concept having the above described structure will be explained in detail with reference to accompanying drawings.

The image forming apparatus 1 according to an exemplary embodiment of the present general inventive concept has two handle units 50 disposed the right side surface of the image forming apparatus 1 as illustrated in FIG. 3.

When moving the image forming apparatus 1, as illustrated in FIG. 8, the user inserts a fingertip H into the hook releasing groove 85 of the external cover 80 and pushes the bottom end of the handle member 70 in an upward direction (arrow D) using the fingertip H.

Figure 10:
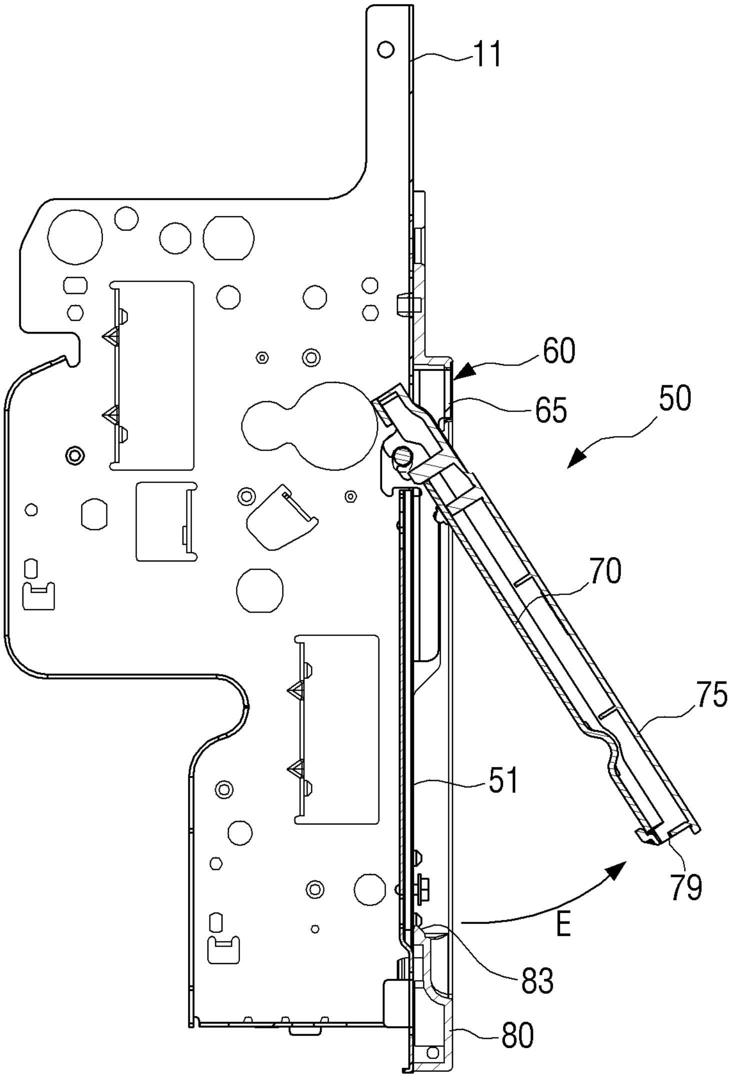
FIG. 10 is a partially sectional view illustrating the handle unit of FIG. 4 when a handle member is rotated in a counterclockwise direction.
Figure 11:
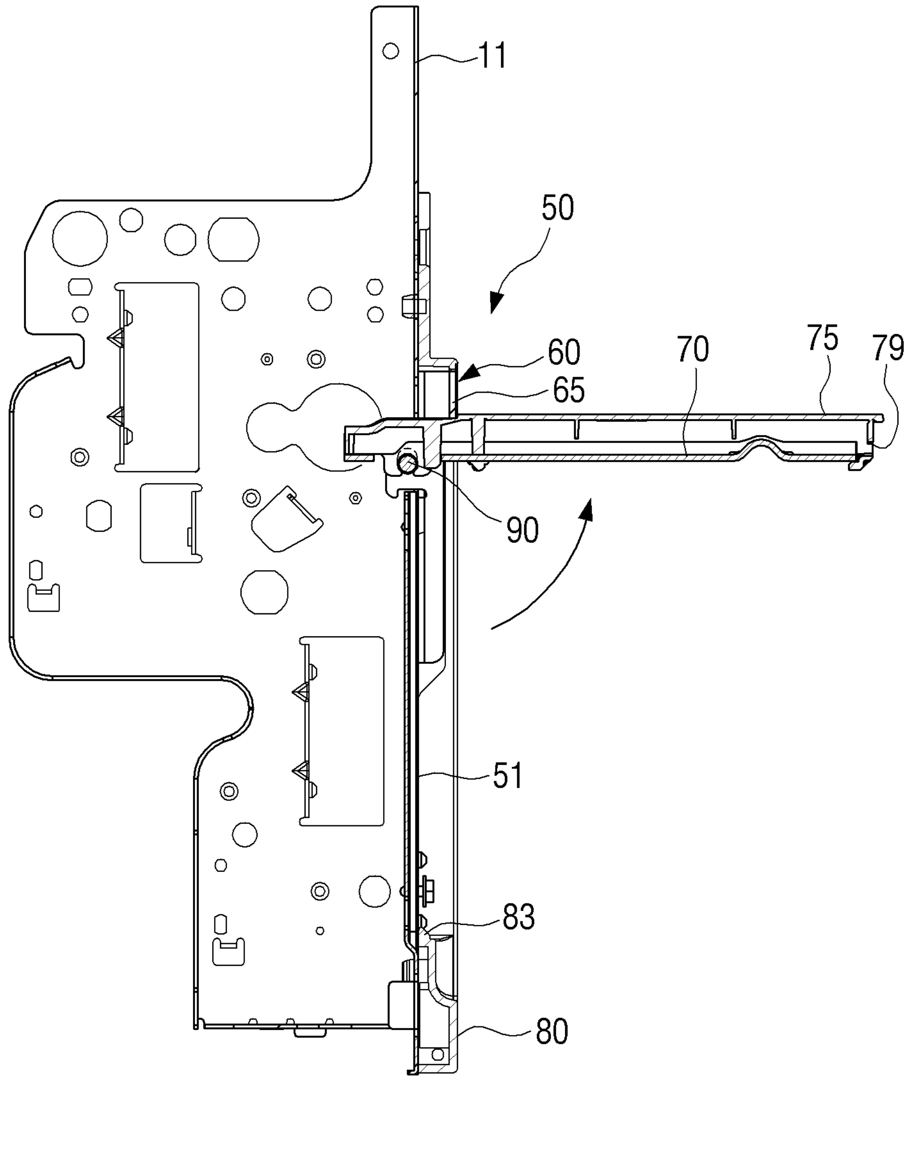
FIG. 11 is a partially sectional view illustrating the handle unit of FIG. 4 when a handle member is rotated to a carrying position.

Then, the handle member 70 is moved upwardly so that as illustrated in C portion of FIG. 9, the hook 79 of the handle member 70 is released from the hook catching portion 83 and the hinge shaft 90 fixed to the handle member 70 is moved from a bottom end (B portion of FIG. 8) to a top end of the fixing hinge hole **63*a* of the fixing bracket 60 as illustrated in B portion of FIG. 9. As a result, the user can rotate the handle member 70 in the counterclockwise direction as arrow E from a first position to an intermediate position as illustrated in FIG. 10. When the handle member 70 moves from the intermediate position to a second position to be bumped or stopped against the stop portion 65 of the fixing bracket 60 as illustrated in FIG. 11, the handle member 70 can no longer rotate. At this time, the handle member 70 forms an angle of substantially 90 degrees with respect to the main body frame 11. In this state, the user grips and lifts up the handle member 70 such that the image forming apparatus 1 can be moved with respect to the stand 110** or reference surface.

When the user releases the handle member 70 during movement of the image forming apparatus 1, the handle member 70 is rotated from the second position to the first position in the clockwise direction about the hinge shaft 90 to drop by the weight of the handle member 70.

After the handle member 70 is rotated approximately 90 degrees in the clockwise direction, the handle member 70 is received in the handle receiving portion 51 of the main body frame 11. When the handle member 70 is inserted into the handle receiving portion 51, the hook 79 formed on the bottom end of the handle member 70 can be coupled to, caught by, or snapped by the hook catching portion 83 due to a rotation force of the handle member 70. At this time, since there is the inclined surface **79*a* in front of the hook 79 of the handle member 70, the hook 79 of the handle member 70 is smoothly caught to the hook catching portion 83 of the external cover 80. After the hook 79 of the handle member 70 is caught to the hook catching portion 83, even when vibration is applied to or generated in the image forming apparatus 1, the handle member 70 is not shaken with respect to the image forming apparatus 1** so that noise is not generated.

An image forming apparatus according to an exemplary embodiment of the present general inventive concept can have a handle that does not increase the size of the image forming apparatus and does not change significantly an appearance design of the image forming apparatus, and which a user can use to safely and easily move the image forming apparatus, although there is no additional space for a handle due to functional parts disposed inside a main body of the image forming apparatus.

Also, since a handle of an image forming apparatus according to an exemplary embodiment of the present general inventive concept has a structure in that the handle is folded by the weight thereof, that is, the handle is inserted into a handle receiving portion, even when a user release the handle during movement of the image forming apparatus, the handle does not project from a side surface of the image forming apparatus. As a result, during movement of the image forming apparatus, the image forming apparatus may be prevented from being damaged by collision between the handle and other apparatus.

In the above description, a handle unit according to an exemplary embodiment of the present general inventive concept is disposed on an image forming apparatus; however, the handle unit according to the present disclosure is not only used to the image forming apparatus. A handle unit according to an exemplary embodiment of the present general inventive concept may be disposed on heavy office devices having weight between approximately 60 kg and 100 kg that may be used in offices or homes and moved by users, for example, copy machines, printers, multifunctional products, facsimile machines, etc.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus comprising:

a main body of the image forming apparatus; and at least one handle unit disposed on the main body, the handle unit including, a fixing bracket disposed on the main body and having a stop portion;

a hinge shaft disposed on the fixing bracket;

a handle member disposed to rotate with respect to the fixing bracket by the hinge shaft;

a hook formed at an end of the handle member; and a hook catching portion formed on the main body, the hook catching portion to which the hook is caught, wherein the hook is caught to the hook catching portion by weight of the handle member, and wherein the fixing bracket comprises elongate holes in which the hinge shaft is inserted and can be moved up and down in a direction of gravity.

2. The image forming apparatus of claim 1, wherein:

the main body is provided with a handle receiving portion to receive the handle member; and when the handle member is received in the handle receiving portion, a top surface of the handle member is positioned at the substantially same height as a surface of the main body.

3. The image forming apparatus of claim 2, wherein:

the handle member comprises a handle cover; and when the handle member having the handle cover is received in the handle receiving portion, a top surface of the handle cover is positioned at the substantially same height as the surface of the main body.

4. The image forming apparatus of claim 3, wherein:

the handle member is formed of a metal; and the handle cover is formed of a plastic injection molding.

5. The image forming apparatus of claim 1, further comprising:

an external cover disposed on the main body, the external cover comprising an opening having a shape corresponding to the handle member therein.

6. The image forming apparatus of claim 5, wherein the hook catching portion is formed on the external cover.

7. The image forming apparatus of claim 6, wherein the external cover comprises a hook releasing groove formed on a portion corresponding to below an end of the handle member in a lengthwise direction of the handle member when the handle member is positioned in the opening of the external cover.

8. The image forming apparatus of claim 5, wherein the external cover is formed of a plastic injection molding.

9. The image forming apparatus of claim 1, wherein the handle member comprises an inclined surface formed in front of the hook on a bottom end of the handle member.

10. The image forming apparatus of claim 1, wherein the fixing bracket is formed as a single piece part with the main body.

11. The image forming apparatus of claim 1, wherein the fixing bracket comprises at least two fixing brackets disposed on a side surface of the main body and near a bottom surface of the main body.

12. The image forming apparatus of claim 11, further comprising:

at least two recessed handles formed on a side surface of the main body opposite to the side surface on which the fixing bracket is disposed.

13. A handle unit usable with an apparatus having a main body, comprising:

a fixing bracket disposed on the main body and having a stop portion;

a hinge shaft disposed on the fixing bracket;

a handle member disposed to rotate with respect to the fixing bracket by the hinge shaft;

a hook formed at an end of the handle member; and a hook catching portion formed on the main body, the hook catching portion to which the hook is caught, wherein the hook is caught to the hook catching portion by weight of the handle member, and wherein the fixing bracket comprises elongate holes in which the hinge shaft is inserted and can be moved up and down in a direction of gravity.

14. A handle unit usable with an image forming apparatus having a main body, comprising:

a handle member having a handle hinge portion, a middle portion, and a hook disposed along a first direction, and having a thickness in a second direction having an angle with the first direction; and a fixing bracket formed on the main body along the first direction, and having side portions extended in the second direction to provide a space to receive the handle member, a fixing hole portion connectable to the handle hinge portion of the handle member such that the handle member rotates with respect to the handle hinge portion between a first position and a second position, a stop portion to contact the handle member disposed in the second position, and a hook catching portion to be coupled to the hook of the handle member moving from the second position to the first position by weight of the handle member, wherein the handle hinge portion includes a hinge disposed in a hole of the fixing hole portion of the fixing bracket when the handle member is coupled to the fixing bracket, and the hole has an area larger than the hinge to provide a space for the hinge to move such that the hook is released from the hook catching portion to move from the first portion to the second portion.

15. The handle unit of claim 14, wherein the handle member has a middle portion extended along the first direction and side portions extended from both sides of the middle portion to have the thickness in the second direction to provide strength to the handle member when the handle member is in the second position and contacts the stop portion of the fixing bracket.

16. The handle unit of claim 14, wherein the side portions have the thickness in the second direction and a length in the first direction, and the length is longer than the thickness.

17. The handle unit of claim 14, wherein the handle member has a length between the handle hinge portion and the hook the in the first direction to provide a coupling force between the hook and the hook catching portion when the handle member rotates from the second position to the first position, and the length is longer than the thickness.

18. The handle unit of claim 14, wherein the fixing bracket includes an inclined surface to guide the hook to the hook catching portion during a coupling operation between the hook and the hook catching portion according to the weight of the handle member.

* * * * *

UNITED STATES PATENT AND TRADEMARK OFFICE
CERTIFICATE OF CORRECTION

PATENT NO. : 9,081,357 B2
APPLICATION NO. : 13/729542
DATED : July 14, 2015
INVENTOR(S) : Jin-ho Park et al.

It is certified that error appears in the above-identified patent and that said Letters Patent is hereby corrected as shown below:

In the Claims

Col. 13, line 16, claim 17, delete "the in" and insert --in-- therefor.

Signed and Sealed this
Thirteenth Day of October, 2015

Michelle K. Lee

Michelle K. Lee
*Director of the United States Patent and Trademark Office*